(12) United States Patent
Nisper et al.

(10) Patent No.: US 8,237,138 B2
(45) Date of Patent: Aug. 7, 2012

(54) SYSTEMS AND METHOD FOR OPTICAL SCATTER IMAGING OF LATENT IMAGE PLATES

(75) Inventors: Jon Kenneth Nisper, Grand Rapids, MI (US); Michael J. Weber, Rockford, MI (US); Thomas M. Richardson, Ada, MI (US)

(73) Assignee: X-Rite, Inc., Grand Rapids, MI (US)

( * ) Notice: Subject to any disclaimer, the term of this patent is extended or adjusted under 35 U.S.C. 154(b) by 437 days.

(21) Appl. No.: 12/422,337

(22) Filed: Apr. 13, 2009

(65) Prior Publication Data
US 2009/0244636 A1    Oct. 1, 2009

Related U.S. Application Data

(63) Continuation-in-part of application No. 11/517,911, filed on Sep. 8, 2006, now Pat. No. 7,538,334.

(60) Provisional application No. 60/715,117, filed on Sep. 8, 2005, provisional application No. 60/788,899, filed on Apr. 3, 2006.

(51) Int. Cl.
*G01N 21/86* (2006.01)
*G01B 11/00* (2006.01)

(52) U.S. Cl. .................................. 250/559.07; 356/389

(58) Field of Classification Search ............ 250/559.07; 356/237.1–237.5, 389, 397, 445
See application file for complete search history.

(56) References Cited

U.S. PATENT DOCUMENTS

| 4,262,208 | A | 4/1981 | Suzki et al. |
| 5,185,644 | A | 2/1993 | Shimoyama et al. |
| 2003/0049039 | A1 | 3/2003 | Suzuki |
| 2003/0143488 | A1 | 7/2003 | Teng |
| 2004/0061850 | A1* | 4/2004 | Fisch et al. .................. 356/237.2 |
| 2004/0179922 | A1 | 9/2004 | Blake et al. |
| 2005/0073596 | A1 | 4/2005 | Takahashi |

FOREIGN PATENT DOCUMENTS
EP    0469765    2/1992
JP    10135112   5/1998

OTHER PUBLICATIONS

Machine English Translation of Applicant's Admitted Prior Art: Japanese Patent 10135112A, Oct. 9, 2008.

(Continued)

*Primary Examiner* — Thanh X Luu
(74) *Attorney, Agent, or Firm* — McCarter & English, LLP

(57) ABSTRACT

Computer-implemented systems and methods for processing image data of a process-free plate are provided according to the present disclosure. The systems and methods may, generally, include a data acquisition step/means for receiving image data using one or more channels of a imaging system, each channel functioning to image the same target region of a process-free plate using a different wavelength of light, and a data processing step/means for filtering the image data using at least one of: (i) self-filtering, (ii) Fourier shrinkage and (iii) Wavelet shrinkage. When the image data is received using a plurality of channels, the received image data may advantageously be combined so as to optimize contrast-to-noise performance. The disclosed systems and methods may advantageously perform the operations of image de-noising, contrast enhancement, and thresholding, and may further involve compensation techniques, e.g., for minimizing distortion and blurring effects.

25 Claims, 6 Drawing Sheets

OTHER PUBLICATIONS

Shiokawa, et al., In Situ Observation and Correction of Resist Patterns in Atomic Force Microscope Lithography, Applied Physics Letters, AIP, American Institue of Physics, vol. 72, No. 19, May 1998, pp. 2481-2483.

Milner, et al., Latent Image Exposure Monitor Using Scatterometry, Proceedings of the SPIE—The International Society for Optical Engineering USA, vol. 1673, 1992, pp. 274-283.

PCT Inernational Search Report dated Jul. 4, 2007.

Donoho, De-Noising by Soft-Thresholding, IEEE Transactions on Information Theory, vol. 41, No. 3, May 1995.

Donoho, et al., Adapting to Unknown Smoothness via Wavelet Shrinkage, vol. 90, No. 432, pp. 1200-1224, 1995.

Bailey, Detecting Regular Patterns Using Frequency Domain Self-Filtering, IEEE pp. 440-443, 1997.

Steidl, et al., Relations Between Soft Wavelet Shrinkage and Total Variation Denoising, LNCS 22449, pp. 198-205, 2002.

Buades et al., A Review of Image Denoising Algorithms, With a New One, Multisclae Model. Simul., vol. 4, No. 2, pp. 490-530, 2005.

* cited by examiner

SYSTEMS AND METHOD FOR OPTICAL SCATTER IMAGING OF LATENT IMAGE PLATES

CROSS-REFERENCE TO RELATED APPLICATIONS

The present application is a Continuation-in-Part (CIP) of co-pending, commonly assigned non-provisional U.S. patent application Ser. No. 11/517,911 entitled "DEVICES AND METHODS FOR TARGETING PRINTING PLATES AND MEASURING DOT COVERAGE THEREON," filed on Sep. 8, 2006, which, in turn, claims priority to U.S. Patent Application No. 60/715,117 entitled "METHOD OF TARGETING AND READING DOT COVERAGE ON 'PROCESSLESS' AND 'SEMI-LATENT IMAGE' CTP PRINTING PLATES," filed Sep. 8, 2005, and to U.S. Patent Application No. 60/788,899 entitled "DEVICES AND METHODS FOR TARGETING PRINTING PLATES AND MEASURING DOT COVERAGE THEREON," filed Apr. 3, 2006. The entire contents of the foregoing non-provisional and provisional patent application are incorporated herein by reference.

BACKGROUND

1. Technical Field

The present disclosure relates to systems and methods for targeting and analyzing an area of a process-free plate, e.g., for reading dot coverage and/or rendering an image of the targeted area of the plate on a display.

2. Background Art

Modern lithographic printing plates have a photosensitive top layer applied to a substrate, typically aluminum. Part of the photosensitive layer is exposed to light, and either the exposed or unexposed portion of this layer is removed. The traditional lithographic workflow removes the exposed (or unexposed) portion of the photosensitive layer as part of a developing process that is performed before mounting the plate on a printing press. Quality control measurements of the plate using imaging techniques can be taken before mounting the plate, and the contrast between the remaining photosensitive layer and the revealed substrate enables routine computation of the dot coverage. Measuring dot coverage may comprise, for example, measuring the size, spacing or angle of the dots that make up a printed image.

Printing plates known as process-free plates do not have a developing process applied to them before they are mounted on a press (see, e.g., U.S. Pat. No. 4,115,127 to Ikeda, et al.). Note that for the purposes of the present disclosure, the term "process-free plates" is intended to encompass any "low-contrast" plate, including but not limited to "processless," "latent image" or "semi-latent image" plates. Such process-free plates exhibit limited contrast between the photosensitive layer and the substrate. The contrast is generally on the same order as the variation in reflected intensity within each homogeneous region of exposed or unexposed photosensitive material. As a result, traditional methods for targeting and analyzing printing plates, e.g., measuring dot coverage, are often ineffective with respect to process-free plates.

Although the variation in intensity within the homogeneous regions is due to properties of the plate itself, and not due to noise introduced by the imaging system of a measurement device, enhancement of the image to enable computing the dot coverage of process-free plates may still be viewed as an image de-noising problem. Numerous techniques have been developed for image de-noising (see, e.g, U.S. Pat. Nos. 7,120,308, 7,260,269 and 7,352,90 to Guleryuz; PCT Publication No. WO/2006/050364A to Awate et al.; and Buades, B. Coll, J. M Morel, "A review of image de-noising algorithms, with a new one," Multiscale Modeling and Simulation (SIAM interdisciplinary journal), Vol 4 (2), pp: 490-530, 2005).

There are a number of types of dot patterns used to produce the different density levels on a plate image. Of note, most types of dot patterns try to avoid both high frequency and low frequency components.

Despite efforts to date, there is a need for improved systems and methods for targeting, measuring and/or otherwise analyzing process-free plates. These and other needs are satisfied by the systems and methods of the present disclosure.

SUMMARY

Computer-implemented systems and methods for processing image data of a process-free plate are provided according to the present disclosure. The systems and methods may, generally, include a data acquisition step/means for receiving image data using one or more channels of an imaging system, each channel characterized as imaging the same target region of a process-free plate using a different wavelength of light, and a data processing step/means for filtering the image data using at least one of: (i) self-filtering, (ii) Fourier shrinkage, and (iii) wavelet shrinkage. The image data is generally received using a plurality of channels and the received image data may advantageously be combined so as to optimize contrast-to-noise performance. The systems and methods disclosed herein may apply additional filtering steps and/or perform image analysis for optimizing the contrast-to-noise ratio.

In exemplary embodiments the disclosed systems and methods may advantageously perform operations of image de-noising, contrast enhancement and thresholding. In addition, the disclosed systems and methods may employ compensation technique(s), e.g., for minimizing distortion and blurring effects.

Additional features, functions and benefits of the disclosed systems and methods will be apparent from the description which follows, particularly when read in conjunction with the appended figures.

BRIEF DESCRIPTION OF THE DRAWINGS

To assist those of ordinary skill in the art in making and using the disclosed systems and methods, reference is made to the appended figures, wherein.

DESCRIPTION OF EXEMPLARY EMBODIMENT(S)

Figure 1:
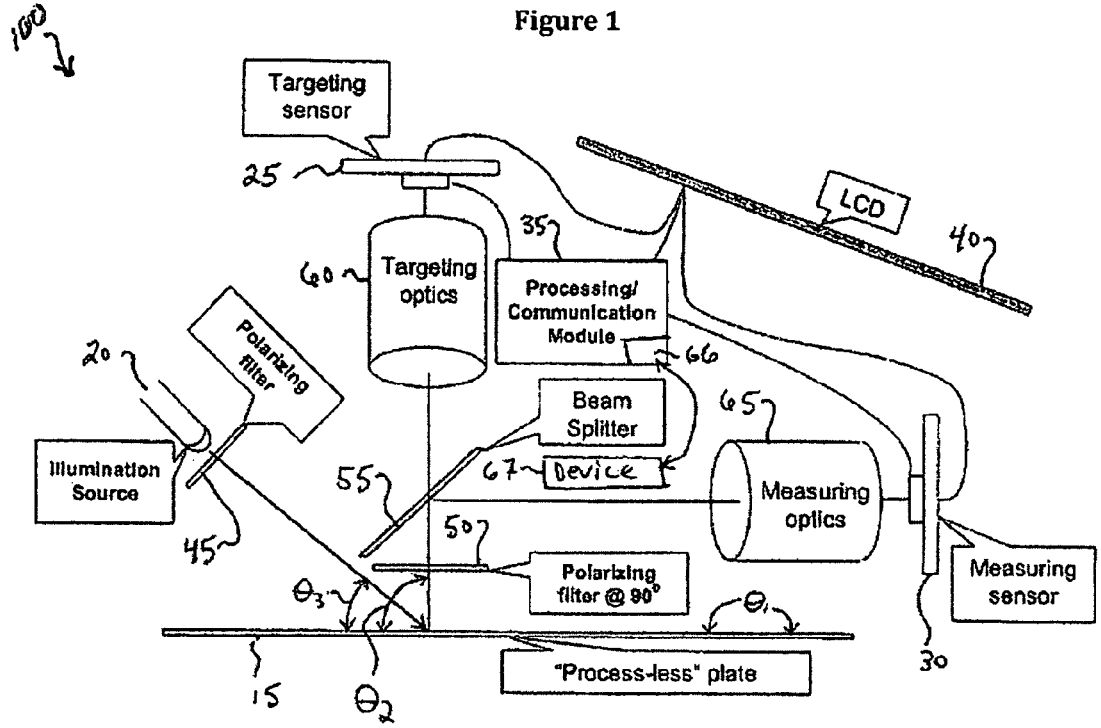
FIG. 1 depicts an exemplary system for targeting and/or analyzing process-free plates according to the present disclosure.

According to the present disclosure, advantageous systems and methods are provided for facilitating imaging of process-free plates.

For the purposes of this disclosure, a process-free plate may comprise, e.g., a substrate and one or more energy sensitive layers disposed relative to the substrate. Typically, the substrate is an aluminum sheet. However, the substrate may comprise any self-supporting material including but not limited to polymeric films, glass, ceramics, metals or paper or a lamination of any of these materials. The one or more energy sensitive layers of a process-free plate may advantageously respond to exposure at the predetermined wavelength to initiate crosslinking of the molecules thereof. Thus, in exemplary embodiments, an image may be formed on a process-free plate by exposing regions of the plate to the crosslinking wavelength. Although it is appreciated that the crosslinked regions may in various embodiments represent a positive or a negative of the image, for purposes of the present disclosure, crosslinked regions of the process-free plate are referred to as the image areas of the plate and non-crosslinked regions are referred to as the non-image areas of the plate. Although not limited in this context, the systems and methods described herein may be employed in targeting and measuring a process-free plate comprising image areas formed by exposure at a crosslinking wavelength. Note that a selected target area may comprise image as well as non-image areas of the process-free plate.

In exemplary embodiments, the image areas may be formed of dots, e.g., corresponding to the CMYK printing configuration for the image. Thus, in various embodiments, the image areas may be formed using various screening techniques, e.g., amplitude modulation (AM), frequency modulation (FM) or stochastic, hybrid and/or cross-modulated (XM) screening techniques. In AM screening, the size of the constituent dots may vary based on tonal values. Larger dots render darker tonal values, or more saturated color, while smaller dots are used for lighter values. The dots are placed on a fixed grid, and the inks are applied at specified screen angles, creating the illusion of a continuous range of colors. In stochastic or FM screening, on the other hand, smaller dots of uniform size are used. To achieve darker or lighter tones, the number of dots and their placement are modified. FM screening may sometimes be referred to as stochastic screening because the placement appears to be random, although dot placement is precisely controlled by sophisticated mathematical algorithms. In further embodiments, both the AM and FM screening techniques may be applied. Plates formed using both AM and FM techniques are commonly referred to as hybrid or XM plates.

The present disclosure provides systems and methods for targeting and reading process-free plates. More particularly, the present disclosure provides systems and methods for capturing and processing image data specific to process-free plates. In exemplary embodiments, the processed image data is used to enable viewing and targeting, e.g., of test image regions of the process-free plate. In further exemplary embodiments, the image data is used to measure and analyze dot coverage of a targeted region.

The present disclosure also provides systems and methods for illuminating a process-free plate with low-intensity light around the crosslinking wavelength for the plate. The low intensity light around the crosslinking wavelength advantageously provides for higher contrast image data, while avoiding image degradation due to unwanted cross-linking. In exemplary embodiments, the process-free plate may be illuminated with a band of low-intensity light around the crosslinking wavelength. It is noted that in exemplary embodiments, e.g., for scatter imaging of the process-less plates, it is advantageous that the illumination light be close to, but not at, the crosslinking wavelength (i.e., due to high absorption at the crosslinking wavelength).

In addition, the present disclosure provides systems and methods for detecting reflected light from the process-free plate for rendering an image of the plate, e.g., on a display. The display may be a visual optical element, for example, or an electronic display device, such as a liquid crystal display (LCD) or cathode ray tube (CRT). Once the reflected light is detected, image data from the image areas formed on the process-free plate may be processed and displayed to facilitate targeting.

In exemplary embodiments, the detection of reflected light involves scatter imaging of the process-free plate. Thus, specular-excluded imaging may be employed, e.g., to increase the contrast between image areas and non-image areas. In exemplary embodiments, specular-excluded illumination, e.g., diffuse illumination, of the process-free plate may facilitate higher contrast imaging of the plate.

The following definitions may be applicable to the embodiments herein. "Embedded" refers to the positioning of an instrument mounted inside a device (e.g., such as an OEM device); "inline" refers to the instrument being mounted externally with respect to the device; "online" refers to the instrument being mounted outside of and not on the device, but installed on the same process line as the device.

With initial reference to FIG. 1, a block diagram of an exemplary imaging system 100 for targeting and analyzing a process-free plate is depicted. In exemplary embodiments, the system 100 may be employed to target, read and measure dot coverage on a process-free plate, such as a printing plate 15. More particularly, the system 100 may be employed to measure, e.g., the size, spacing or angle of the dots that form an image using AM, FM, hybrid and/or XM screening techniques, among others. The system 100 may comprise an illumination source 20, a targeting sensor 25, a measuring sensor 30, a processing/communication module 35 and a display 40. The system 100 also may comprise a first 90-degree-turned polarizing filter 45 for filtering light emitted by the illumination source 20, a second 90-degree-turned polarizing filter 50 for filtering light reflected from the printing plate 15, and a beam splitter 55 for directing light reflected from the printing plate 15 to both the targeting sensor 25 and the measuring sensor 30. In exemplary embodiments, the polarizing filter 45 and the illumination source 20 may be formed integrally as a single element or light source. In further embodiments embodiment, the polarizing filter 45 and/or the illumination source 20 may be interchangeable or replaceable, whether formed integrally or as separate elements.

The system 100 further may comprise targeting optic components 60 and measuring optic components 65 for processing light reflected from the printing plate 15 prior to it being received by the targeting and measuring sensors 25, 30, respectively. In various embodiments, the respective orientations of the measuring and targeting sensors 30, 25 may be approximately 0° ($\theta_1$) and 90° ($\theta_2$), respectively, relative to the printing plate 15, although the embodiments are not limited to these angular orientations as other suitable angular orientations may be employed. In exemplary embodiments, the illumination source 20 may be configured to generate low-intensity light around the crosslinking wavelength to illuminate the printing plate 15, although the present disclosure is not limited to such embodiments. The light may be transmitted at an illumination angle $\theta_3$ formed between the illumination source 20 and the printing plate 15. In one embodiment, the illumination angle $\theta_3$ may be approximately 45° relative to the printing plate 15, thus effecting specular excluded imaging of the printing plate 15. Other suitable illumination angles $\theta_3$ may be used and the embodiments are not necessarily limited in this context.

According to various embodiments, the illumination source 20 may be implemented in any suitable manner. For example, the illumination source 20 may comprise a single light or multiple light sources. The illumination source 20 may be polarized or nonpolarized. A polarized illumination source 20 may comprise a light source formed with an integral polarizing filter, for example. Each of the light sources may emit light in one or more wavelengths, including wavelengths in the visible or invisible spectrum. Multiple light sources may be arranged in one or more configurations. These configurations may comprise, for example, single or multiple linear arrays of light sources, a rectilinear arrangement (e.g., rectangular or square), a ring or solid circular arrangement, among others. In one embodiment, the illumination source may be implemented with multiple light sources arranged in a ring. The light sources may be configured for emitting light at one or more wavelengths and at one or more illumination angles $\theta_3$. In one embodiment, the light sources may be configured to generate light around one or more common crosslinking wavelengths.

According to various embodiments, the illumination angle(s) $\theta_3$ of light emitted by the illumination source 20 may be adjustable. In one embodiment, for example, the illumination source 20 may comprise multiple light-emitting diodes (LED) attached to a flexible substrate that may be suitably deflected to produce desired illumination angle(s) $\theta_3$. Such illuminator configurations are disclosed in provisional Patent Application No. 60/788,900 entitled "LIGHT SOURCE AND INSTRUMENTS INCLUDING SAME," which is incorporated herein by reference in its entirety.

Light around the crosslinking wavelength emitted by the illumination source 20 may be generated, for example, using an LED, although any suitable light source capable of emitting light around the cross linking wavelength may be employed. The illumination source 20 may be formed as a wide spectral multi-point illumination source comprising multiple LEDs in any suitable arrangement. In one embodiment, the illumination source 20 may comprise multiple LEDs arranged in a ring configuration. The multiple LEDs may be selected to emit light at multiple wavelengths. In one embodiment, several LEDs may be arranged to emit light at the same wavelength while other LEDs emit light at a different wavelength and so on. Also, the LEDs may be spaced apart or arranged at various angles relative to each other. Evenly spaced LEDs may be arranged such that they are spectrally balanced, for example. The LEDs may emit light around one or more common crosslinking wavelengths.

Figure 2:
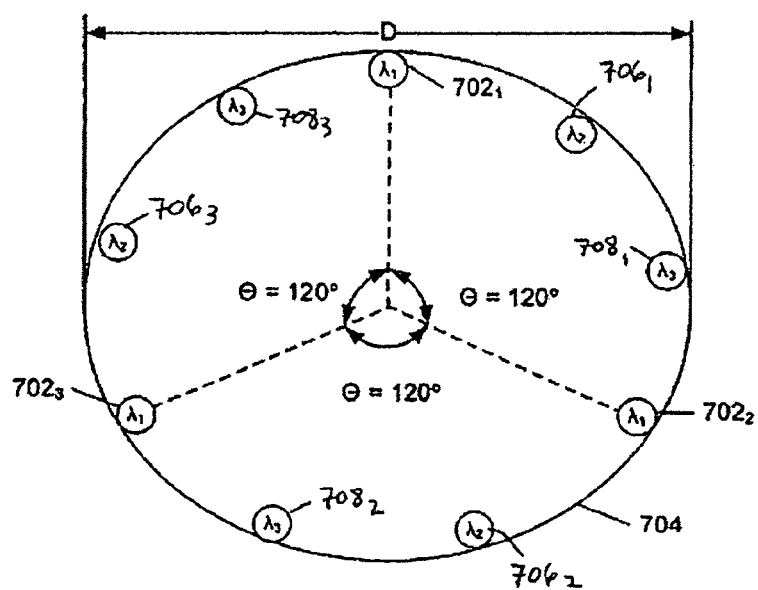
FIG. 2 depicts an exemplary illumination scheme for the system of FIG. 1.

FIG. 2 illustrates one embodiment of an illumination source comprising an illumination ring 700 comprising multiple light sources 702, 706, 708 arranged in the form of a ring 704. For example, in one embodiment, the light sources 702, 706, 708 may be LEDs arranged in the form of a ring 704. In one embodiment, the illumination ring 700 may comprise three groups or banks of three light sources 702$_{1-3}$, 706$_{1-3}$, 708$_{1-3}$ arranged in the ring 704 with a 120° separation angle between each of the three light sources in each group. Each group of light sources 702$_{1-3}$ 706$_{1-3}$, 708$_{1-3}$ may emit light at a different wavelength $\lambda$. For example, light sources 702$_{1-3}$ are arranged at a 120° separation angle between them and emit light at a first wavelength $\lambda_1$; light sources 706$_{1-3}$ are arranged at a 120° separation angle between them and emit light at a second wavelength $\lambda_2$; and light sources 708$_{1-3}$ are arranged at a 120° separation angle between them and emit light at a third wavelength $\lambda_3$. It will be appreciated that additional LEDs may be arranged in the ring 704 at a separation angle of 1200.

In various other embodiments, the illumination ring 700 comprises n light sources or groups of light sources (where n is any integer) arranged in the ring 704 configuration that emit light at n different wavelengths. For example, the illumination ring 700 may comprise twenty LEDs grouped into five banks of four LEDs each, where the LEDs in each bank are spaced at approximately 90° from each other. In one embodiment, the multiple light sources 702 (e.g., LEDs) each may emit light of the same wavelength or may emit light at different wavelengths, e.g., $\lambda_{1-3}$. In one embodiment, the diameter D of the illumination ring 700 may be selected to be sufficiently large so as not to interfere with the field of view of the targeting sensor 25 and the targeting optics 60, for example. In one embodiment, the geometry and orientation of the illumination ring 700 may be configured to generate a uniform illumination spot on the imaging member (e.g., the printing plate 15). The area illuminated by the illumination spot may be referred to as a target area, for example. If the target comprises a crosslinked portion of the imaging layer, the target area may be referred to as an image target area. In one embodiment, the illumination ring 700 may be formed to provide an illumination spot on the imaging member that may be uniform to approximately 10% across a diameter of approximately 3 mm.

The wavelengths $\lambda_1$, $\lambda_2$ and/or $\lambda_3$ of the light emitted by one or more of the light sources 702, 706, 708 (e.g., LEDs) may be selected to enhance the contrast of the image target area relative to the non-image target area of the imaging member. For example, in one embodiment, the wavelengths of the light emitted by the one or more of the light sources 702 may be selected to optimally enhance the contrast of latent images formed on the image area relative to the non-image area formed on the imaging member (e.g., the printing plate 15). In one embodiment, the wavelengths of the light emitted by the one or more of the light sources 702 may be around the crosslinking wavelengths. Additionally, specular-excluded light reflected from the printing plate 15 may provide a higher contrast to optically display the target image area.

With reference back to FIG. 1, in one embodiment, the illumination source 20 may comprise a light source similar to the illumination ring 700 in FIG. 2. The light source may comprise one or more LEDs that emit wavelengths in the visible spectrum, invisible spectrum or a combination thereof. For example, the light source may emit wavelengths in any one of the visible spectrum of approximately 405, 470, 520 and 630 nm; and in the invisible spectrum of approximately 830 nm. In one embodiment, a light source may be polarized or non-polarized. A polarized light source may comprise an LED integrally formed with a polarizing filter to emit polarized light. It will be appreciated that the number of banks, the number of LEDs in each bank, as well as the orientation of the banks within the illumination source 20 may be varied or modified as needed. The brightness and power dissipation of the LEDs may be individually controlled using known pulse-width modulation techniques among others. The LEDs may be energized in any suitable manner and in any combination using control logic such as, for example, programmable control logic. According to various embodiments, the control logic may be contained within a field programmable gate array (FPGA) or other suitable programmable medium integral to the system 100, such as a processor or other computing device.

In various embodiments, additional contrast enhancing may be provided by selecting a pair of wavelengths emitted by the illumination source 20 on opposite sides relative to the crosslinking wavelength. To address the existence of different process-free plate types which may have different crosslinking wavelengths, embodiments may include the capability to manually and/or automatically adjust or replace the illumination source 20 to suit the particular crosslinking wavelength of each different printing plate type.

According to various embodiments, the beam splitter 55 may be implemented using a half-silvered mirror or other suitable optical device for re-distributing light reflected from the printing plate 15 to the targeting and measuring optics 60, 65, respectively. In one embodiment, the beam splitter 55 may be characterized by an 80/20 configuration, wherein approximately 20% of the received light reflected from the printing plate is directed to the targeting optics 60 and approximately 80% of the received light reflected from the printing plate is directed to the measuring optics 65. It will be appreciated, however, that the beam splitter 55 may be configured to distribute the light reflected from the printing plate 15 in accordance with any suitable distribution ratio. Therefore, the embodiments are not limited in this context.

The targeting and measuring optics 60, 65, respectively, may comprise one or more optical components for suitably processing the light reflected from the printing plate 15 prior to its being received by the targeting and measuring sensors 25, 30, respectively. Such components may include, for example, an aperture and/or a shutter for controlling the amount of light passed to the respective targeting and measuring sensors 25, 30 and one or more lenses for controlling field of view.

According to various embodiments, the targeting sensor 25 may be implemented using a Complimentary Metal Oxide Semiconductor (CMOS) or a Charge Coupled Device (CCD) digital camera for receiving the light reflected from the printing plate 15 via the targeting optics 60. The targeting sensor 25 typically generates images corresponding to the images on the target area of the imaging member or measurable medium such as the printing plate 15. In one embodiment, the targeting sensor 25 may comprise a CMOS color camera having a suitable resolution and output format. For example, the targeting sensor 25 may be a CMOS color camera having 640× 480 pixel resolution and a VGA output format.

According to various embodiments, the measuring sensor 30 may be implemented using a CMOS or CCD digital camera for receiving the light reflected from the target area via the measuring optics 65. The measuring sensor 30 typically generates images corresponding to the images on the printing plate 15. In one embodiment, the measuring sensor 30 may comprise a CMOS monochrome camera having a suitable resolution. For example, the measuring sensor 30 may be a CMOS monochrome camera having a 1.3 mega pixel resolution and an 8 or 10-bit pixel resolution (i.e., 256 or 1024 gray scale levels per pixel, respectively). In one embodiment, the measuring optics 65 or the measuring sensor, either individually or in combination, may magnify the portion of the light reflected from the printing plate 15 to reveal the underlying dot structure or dot pattern such as, for example, the size, spacing and angle of the dots formed on the target area of the printing plates being illuminated.

The processing/communication module 35 (e.g., processor) may be adapted to capture images from the targeting sensor 25 and/or the measuring sensor 30. The processing/communication module 35 may then display the captured images on the display 40, such as the LCD display. The processing/communication module 35 also may be adapted to receive and process information, whether from an external device or a user. The processing/communication module 35 also may be adapted to transmit information to an external device or a user. In one embodiment, the processing/communication module 35 may comprise an interface 66 to communicate using any suitable protocol. The interface 66 may be a wired or wireless interface. In various embodiments, the interface 66 may be a wired or wireless universal serial bus (USB) type interface. In various embodiments, the images captured by the system 100 may be ported to an external processing device 67 via the interface 66. Examples of the external processing device 67 may include a computer, an inline digital plate setting machine, an embedded digital plate setting machine, or any suitable external processing device that may utilize the output of the system 100.

As noted above, the system 100 may comprise a graphical user interface implemented using the processing/communication module 35 and the display 40. According to various embodiments, the graphical user interface may be programmed using any suitable programming tool and may support four general modes of operation: calibration, measurement, configuration and analysis. In the calibration mode, one or more calibration routines for calibrating the instrument may be executed. Information relating to instrument calibration may be communicated from the system 100 to an external device (e.g., a PC) via a suitable communication link (e.g., USB port, serial port, etc.) supported by the processing/communication module 35, such as the interface 66. In various embodiments, the communications link may be wired or wireless. The communication link also may be used to communicate calibration information from the external device to the system 100. The configuration mode may enable the setup of one or more instrument connection parameters and control parameters for controlling device operation using, for example, a suitable device communication layer. In the measurement mode, measurement routines may be executed for requesting measurement sets and images for communication to the display 40. In the analysis mode, analysis routines may be executed, for example, to view one or more measurement sets on a graph corresponding to the dot profile of the printing plate 15 from which the measurement set(s) were obtained. Measurement sets and images may be tagged with information such as, for example, the printing plate 15 from which the measurement and image data originated, the press in which the printing plate 15 is used, and the configuration of the press. Additionally, the measurement sets and images may be saved to files internal to the system 100 and recalled as needed. Still further, the measurement sets and images may be transferred to the external device (e.g., a PC) via the communication link by way of the interface 66. Other operational modes, as well as other features and functions, may be incorporated in other embodiments of the system 100.

In general, it will be apparent to one of ordinary skill in the art that various embodiments described herein may be implemented in, or in association with, many different embodiments of software, firmware and/or hardware. The actual software code or specialized control hardware used to implement some of the present embodiments is not intended to limit the scope of the embodiments. For example, certain aspects of the embodiments described herein may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. Thus, the operation and behavior of the embodiments may be described without specific reference to the actual software code or specialized hardware components. The absence of such specific references is feasible because it is clearly understood that artisans of ordinary skill would be able to design software and control hardware to implement the various embodiments based on the description herein with only a reasonable effort and without undue experimentation.

Moreover, the processes, systems and devices associated with the present embodiments may be executed by, or in operative association with, programmable equipment, such as computers and computer systems. Software that cause programmable equipment to execute the processes may be stored in any storage device, such as, for example, a computer system (non-volatile) memory, an optical disk, magnetic tape, or magnetic disk. Furthermore, the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer system to perform the process aspects. A computer-readable medium may include, for example, memory devices such as diskettes, compact discs of both read-only and read/write varieties, optical disk drives and hard disk drives. A computer-readable medium may also include memory storage that may be physical, virtual, permanent, temporary, semi-permanent and/or semi-temporary. A computer-readable medium may further include one or more data signals transmitted on one or more carrier waves.

A "computer" or "computer system" may be, for example, a wireless or wireline variety of a microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM) and other computer-readable media.

The present disclosure further provides systems and methods, e.g., computer implemented methods, for processing image data from process-free plates. The image data for processing may advantageously be obtained using, e.g., the system 100 of FIG. 1. More particularly, the image data may be obtained using one or more measurement channels of the system 100, wherein each measurement channel is characterized by a different wavelength of light used to illuminate the process-free plate. In exemplary embodiments, the wavelength(s) of light used to illuminate the process-free plate are selected based on the closest available wavelength(s) relative to the crosslinking wavelength of the process-free plate. Preferably, the selected wavelength(s) are within 100 nm of the crosslinking wavelength. In further exemplary embodiments, a plurality of measurement channels may be selected such that (i) at least one channel corresponds to an illumination wavelength that is less than the crosslinking wavelength and (ii) at least another channel corresponds to an illumination wavelength that is greater than the crosslinking wavelength.

In some instances, it may be desirable to illuminate the process-free plate with a band of light around the crosslinking wavelength, e.g., a 50 nm band of light preferably centered about the crosslinking wavelength. The illumination may advantageously be diffuse illumination. In exemplary embodiments, the measurement channels are configured to detect only specular-excluded light. Thus, scatter imaging of the process-free plate may advantageously be utilized, e.g., to improve the signal-to-noise ratio, and enhance the contrast of the detected image.

Figure 3:
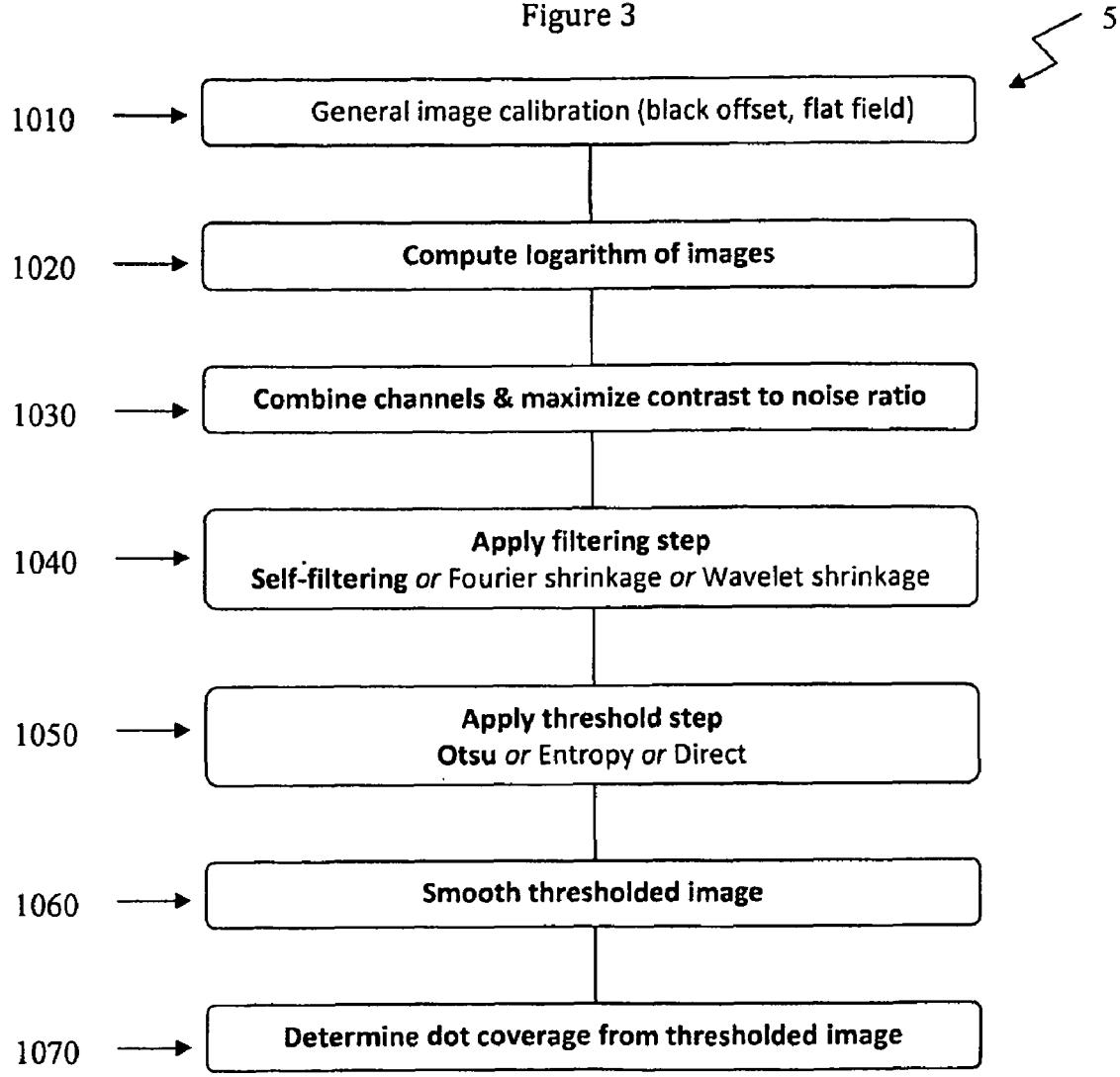
FIG. 3 depicts a flow chart of an exemplary method for computing dot coverage of process-free plates according to the present disclosure.

FIG. 3 depicts a block diagram representative of an exemplary method for processing image data obtained from a process-free plate. While the particular embodiment in FIG. 3 utilizes image data obtained from pair of data channels (corresponding to wavelengths of 630 nm and 830 nm), it is noted that the depicted method may easily be adapted for processing image data from a single channel or from any plurality of channels. The disclosed method may advantageously perform the operations of image de-noising, contrast enhancement and/or thresholding. The method may further include compensating steps to minimize distortion and blurring effects that could cause inaccurate dot coverage computation.

Referring now to FIG. 3, it will be appreciated by one of reasonable skill in the art that the first 1010 and last 1070 steps of the method (general image calibration for each channel and computation of dot coverage, respectively) are not specialized for process-free plates and are generally well known in the field of traditional plate imaging. Accordingly, these steps are not discussed herein. It also noted, with respect to the last step, that computation of dot coverage 1070 is only one of many uses for the processed image data. For example, the processed image data may be used to drive rendering of a targeting image for the process-free plate on a display, e.g., the display 40 of the system 100 in FIG. 1.

Figure 4:
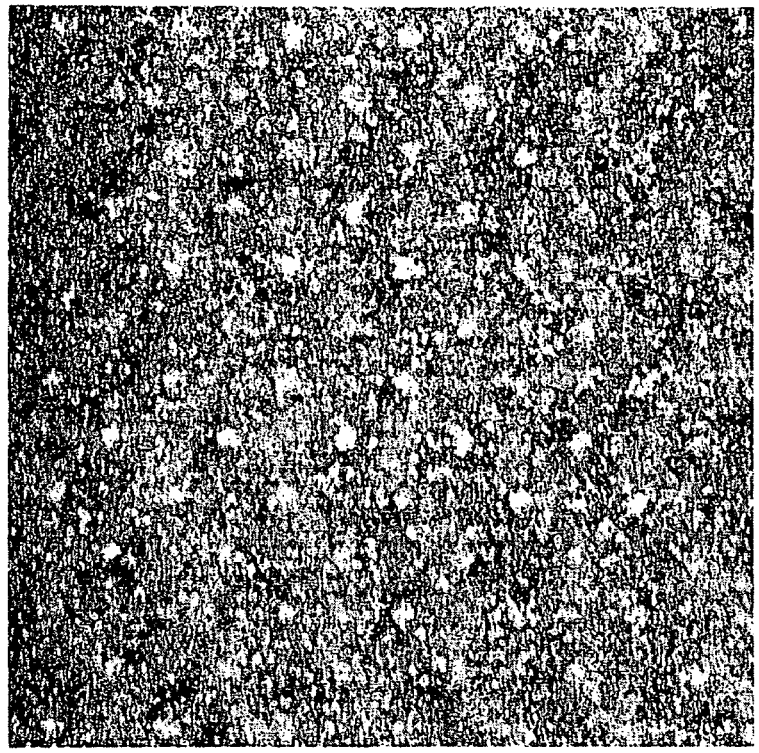
FIG. 4 depicts the log of an image of an exemplary process-free plate data detected via a channel characterized by an illumination wavelength of 830 nm.
Figure 5:
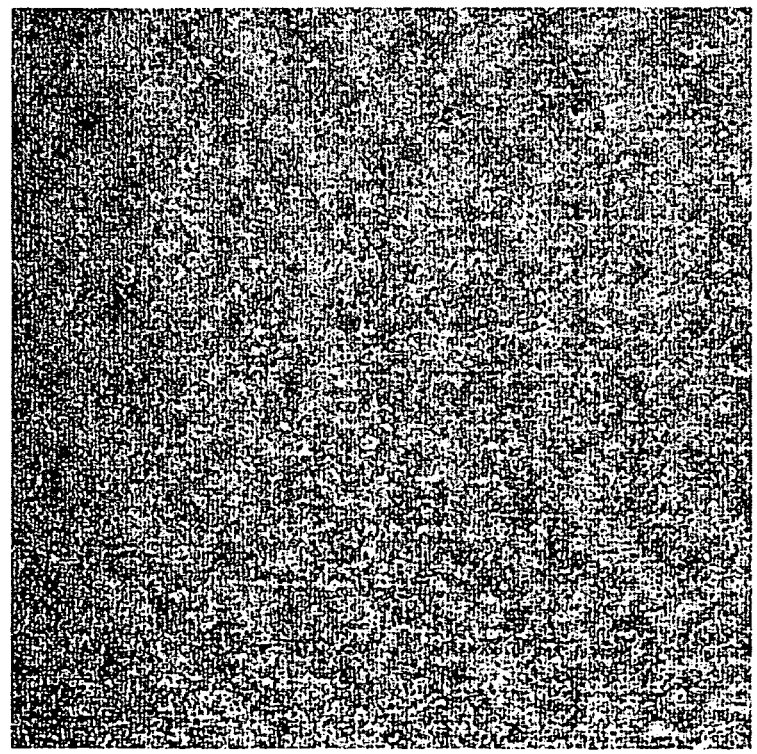
FIG. 5 depicts the log of an image of an exemplary process-free plate data detected using via channel characterized by an illumination wavelength of 630 nm.

The second step 1020 of the method depicted in FIG. 3, advantageously involves computing the logarithm of the images detected for each channel. The second step 1020 is included based on the observation that a typical distribution of pixel intensities for homogeneous plates (i.e., 100% exposed or 0% exposed) tends to fit a log-normal distribution. Thus, computing the logarithm of the detected images ensures that homogeneous regions have a normal distribution of pixel intensities. This normal distribution, in turn, aids in optimizing the contrast-to-noise ratio in the subsequent steps. FIGS. 4 and 5 depict exemplary log images of a process-free plate for 830 nm and 630 nm channels, respectively.

The third step 1030 of the method depicted in FIG. 3 generally involves computing a weighted sum of images acquired using a plurality of channels (i.e., illumination using two or more wavelengths). As will be appreciated by one of reasonable skill in the art, the third step 1030 is particular for multi-channel embodiments and superfluous for single channel embodiments (more particularly, the weighted sum of a single image is that single image). It is noted that the sign (+/−) used for each image in computing the weighted sum corresponds to the difference in average intensity between exposed and unexposed regions.

An exemplary computation of a weighted sum for two-channel embodiments is provided in greater detail herein. Thus, for $\lambda_i, i=1,2$, channels having corresponding images, $I_1, I_2$, weights $w_1, w_2$ may be computed, such that the combined monochrome image $I = w_1 I_1 + w_2 I_2$ advantageously optimizes the contrast-to-noise ratio between exposed and unexposed regions. It is appreciated that there are a number of ways of computing the optimal weights $w_1, w_2$, i.e., depending on how one estimates the noise and contrast of the exposed and unexposed regions of the two images. Assuming that the contrast and noise of the images are given by $C_1, C_2$ and $N_1, N_2$ and that the noise values for a combined image add in quadrature, the optimal contrast occurs with weights $$w_1 = \frac{C_1 N_2^2}{C_1 N_2^2 + C_2 N_1^2} \text{ and } w_2 = 1 - w_1.$$

Figure 6:
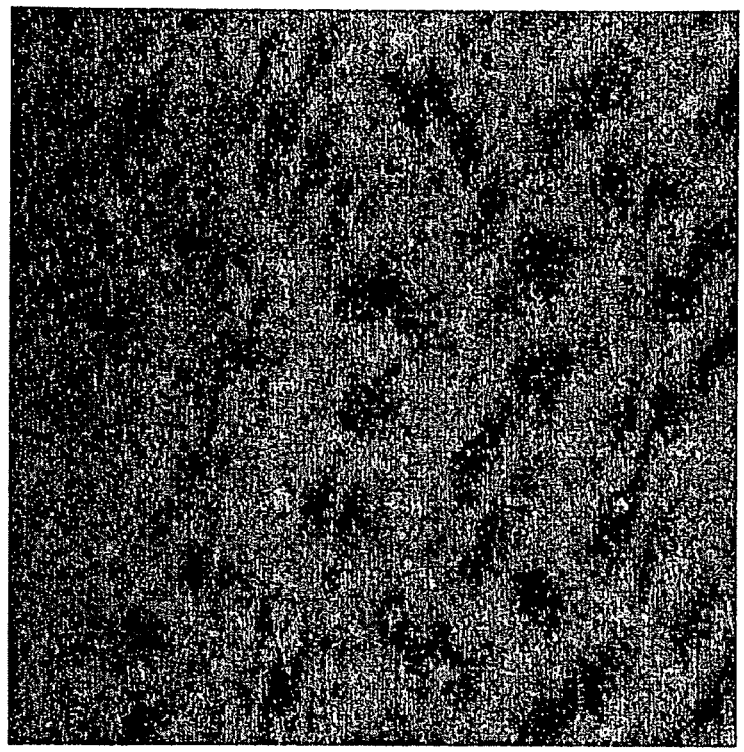
FIG. 6 depicts the weighted sum of the images of FIGS. 4 and 5 for optimal contrast-to-noise performance.

FIG. 6 depicts the computed weighted sum for the images in FIGS. 4 and 5 according to the above exemplary computation, including contrast-to-noise optimization. However, while the above exemplary computation relates specifically to two-channel embodiments, it will be appreciated by one of reasonable skill in the art that the equations may be easily adapted to accommodate any plurality of channels.

The fourth step 1040 of the method depicted in FIG. 3, involves image de-noising. Of the numerous approaches to image de-noising, several techniques have been found to be particularly advantageous to the problem of de-noising images of process-free plates. Thus, in exemplary embodiments, the fourth step 1040 may advantageously include one or more of self-filtering (see D. G. Bailey, "Detecting Regular Patterns Using Frequency Domain Self-filtering", Proceedings of the International Conference on Image Processing, Santa Barbara, Calif., Vol I, pp 440-443 (October 1997)), Fourier shrinkage, and wavelet shrinkage (see Gabriele Steidl, Joachim Weickert, "Relations between Soft Wavelet Shrinkage and Total Variation De-noising", Lecture Notes In Computer Science; Vol. 2449, Proceedings of the 24th DAGM Symposium on Pattern Recognition, Pages: 198-205, 2002; David L Donoho, Iain M Johnstone, "Adapting to Unknown Smoothness via Wavelet Shrinkage", Journal of the American Statistical Association, Vol. 90, No. 432. (1995), pp. 1200-1224; and David L. Donoho, "Denoising via soft thresholding", IEEE Trans. Inform. Theory 41(3) (1995), 613-627). The publications identified in this paragraph are incorporated herein by reference.

Figure 7:
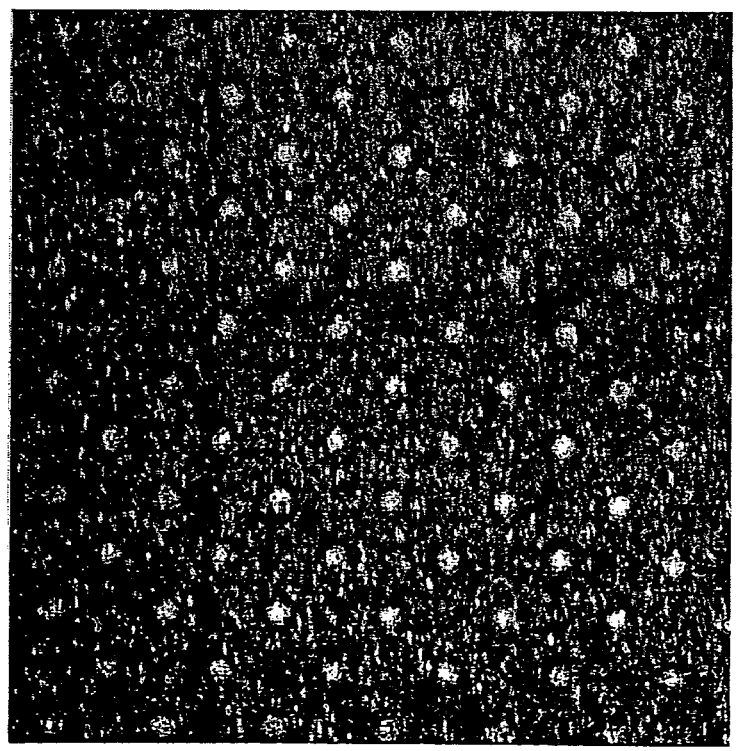
FIG. 7 depicts the weighted sum image of FIG. 6 after de-noising.

FIG. 7 depicts the weighted sum image of FIG. 6 after de-noising using the above techniques. Self-filtering is a Fourier domain filtering method that uses the magnitude of the Fourier transform of the image as the Fourier domain filter. In exemplary embodiments, self-filtering may be combined in sequence with band-pass filtering to eliminate all frequencies known not to occur with a given screening method. Conventional self-filtering techniques have some drawbacks, i.e., self filtering tends to distort/blur images and thus significantly impact measurements of dot coverage. To this end, Bailey describes an anti-blurring compensation of multiplying each filter component by the magnitude of frequency, and a local anti-distortion compensation of applying a local maximum filter to the self-filter (D. G. Bailey, "Detecting Regular Patterns Using Frequency Domain Self-filtering", Proceedings of the International Conference on Image Processing, Santa Barbara, Calif., Vol I, pp 440-443 (October 1997)). A global anti-distortion compensation disclosed as part of this method is to truncate each self-filter magnitude above a defined value to that maximum value. The maximum value may be a fixed fraction of the maximum magnitude of the self-filter. In view of the above compensation techniques, self-filtering is a practical method of de-noising images for process-free plates.

Fourier shrinkage is a Fourier domain filtering technique that advantageously reduces the magnitude of each Fourier component of the image. In soft thresholding, each component is reduced by a threshold value, or set to zero if its magnitude is less than the threshold, while the complex phase of the Fourier component is left unchanged. In hard thresholding, Fourier components less than the threshold are set to zero, while components greater than the threshold are left unchanged. For the depicted method of FIG. 3, Fourier shrinkage may also advantageously be combined with de-blurring compensation, and band-pass filtering. In exemplary embodiments, an estimate for the threshold value is provided as a fixed multiple of an estimate of noise. The estimate of noise may, for example, be determined based on an analysis of the Fourier components outside the known frequency response of the particular screening method used for the process-free plate.

Wavelet shrinkage is similar to Fourier shrinkage, except that it involves Wavelet coefficients instead of Fourier coefficients. Of the particular de-noising approaches discussed herein, wavelet shrinkage is perhaps the best known and may be the most advantageous as a general purpose technique. Due to the structured frequency content of many plate screening patterns, self-filtering and Fourier shrinkage may be of greatest applicability for patterned images, especially with limited range frequency components.

Figure 8:
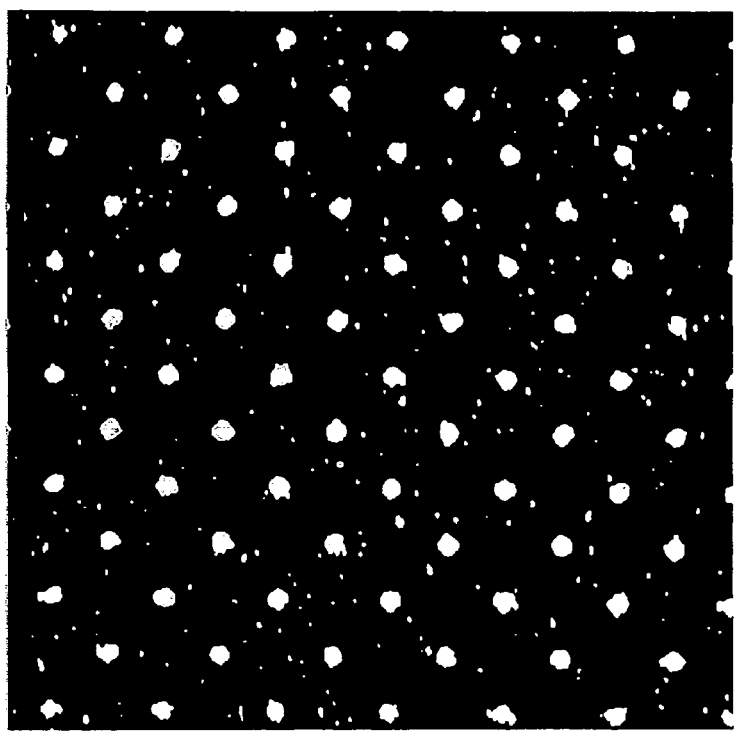
FIG. 8 depicts the de-noised image of FIG. 7 after thresholding.

The fifth step 1050 of the method depicted in FIG. 3 is the thresholding of the filtered (de-noised) image from the fourth step 1040. Thus, the filtered image is generally segmented into two regions based on a threshold value. FIG. 8 depicts the filtered image of FIG. 7 after threshholding.

One well known method for determining an appropriate threshold value is Otsu's method, which chooses a threshold value that minimizes the variance within the two regions. Otsu's method works particularly well wherein, e.g., the histogram of the filtered image values has two discernable peaks. For images of high within-class variance and/or high or low dot percentage, however, the peak of the distribution of values of the smaller region may disappear in the tail of the distribution of values of the larger region. In this situation, Otsu's method will tend to choose a value near the single peak.

A second possible method for determining an appropriate threshold value is Entropy thresholding, which chooses a threshold value that maximizes the entropy of the gray-level co-occurrence matrix of the image. Entropy thresholding generally works well for images whose histogram has one or two peaks. Entropy threshold may, however, occasionally result in a threshold value that is not between the two peaks of a bimodal distribution. Accordingly, in exemplary embodiments, an error checking function may be utilized to discard errant threshold values. In further exemplary embodiments, an imaging system, e.g., system 100 of FIG. 1, may be configured to display a histogram of the filtered image and allow a user to assess potential threshold values.

A third possible method for determining an appropriate threshold value is a direct search of the histogram for a local minimum that is between two local maxima. Note, however, that where the histogram does not have two peaks, this method will not return a value. The principal value, therefore, of the "direct search" method for determining a local minimum may be as a backup method for entropy threshold. More particularly, the method for determining a local minimum may be utilized for instances where the threshold value selected by entropy thresholding does not lie between two peaks of the histogram.

Figure 9:
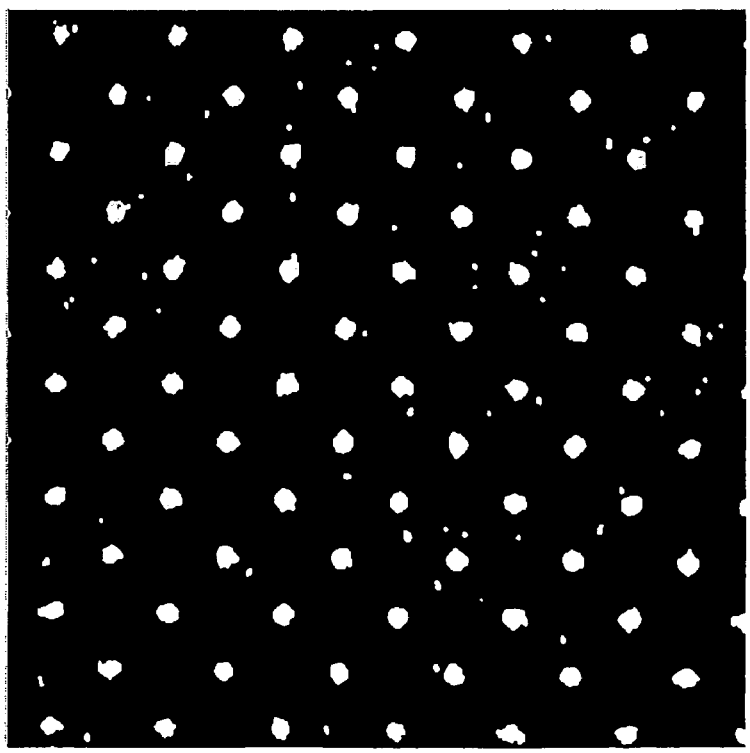
FIG. 9 depicts the thresholded image of FIG. 8 after threshold smoothing.
Figure 10:
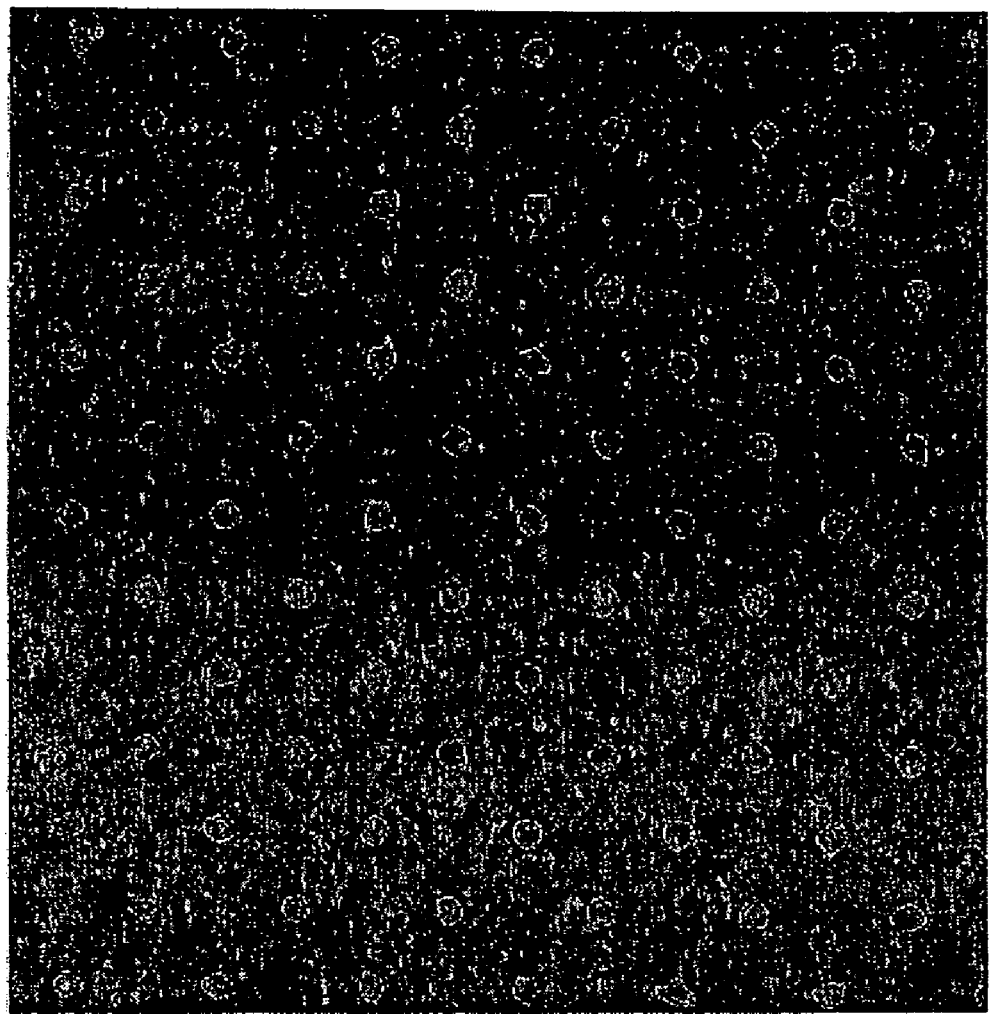
FIG. 10 depicts the de-noised image of FIG. 7 after threshold smoothing.

The sixth step 1060 of the method depicted in FIG. 3 (the threshold smoothing step) is a final de-noising step which may advantageously be applied to the binary (thresholded) image produced by fifth step 1050. In general, the purpose of threshold smoothing is to remove small noise features, particularly for rendering of the thresholded image and its boundary, i.e., on a display. Note that this step typically does not have a significant impact on computed dot coverage. Examples of de-noising operations that may be applied in this step include one or more morphological operations, such as erosion, dilation, opening, and closing. FIG. 9 depicts the thresholded image of FIG. 10 after threshold smoothing. Similarly, FIG. 10 depicts the filtered image of FIG. 7 after threshold smoothing (note that fifth step 1050 of threshhholding is skipped in this instance).

The seventh and final step of the method depicted in FIG. 3 (computing dot coverage) involves evaluating the number of pixels in the 'dot' region as a percentage of the whole image. As previously discussed, measuring dot coverage is only one of many possible uses for the processed image data from the sixth step 1060. For example, the processed image data may alternatively be used to drive a rendering of the process-free plate, e.g., on a display, to facilitate targeting thereof.

Although the present disclosure has been described with reference to exemplary embodiments and implementations thereof, the disclosed apparatus, systems, and methods are not limited to such exemplary embodiments/implementations. Rather, as will be readily apparent to persons skilled in the art from the description provided herein, the disclosed apparatus, systems and methods are susceptible to modifications, alterations and enhancements without departing from the spirit or scope of the present disclosure. Accordingly, the present disclosure expressly encompasses such modification, alterations and enhancements within the scope hereof.

What is claimed:

1. A computer-implemented method for processing image data of a process-free plate, the method comprising:
   (a) a data acquisition step of receiving image data using one or more channels of an imaging system, each channel functioning to image the same target region of a process-free plate using a different wavelength of light;
   (b) when image data is received using a plurality of channels, a data processing step of combining the image data from the plurality of channels; and
   (c) a data processing step of filtering the image data using at least one of: (i) self-filtering, (ii) Fourier shrinkage and (iii) Wavelet shrinkage,
   wherein each wavelength of light is around the crosslinking wavelength for the process-free plate, and
   wherein each channel images the same target region of process-free plate using a wavelength of light that is within approximately one hundred nanometers (100 nm) of the crosslinking wavelength.

2. The method of claim 1, further comprising an initial data processing step of general image calibration of the image data received for each of the one or more channels.

3. The method of claim 1, further comprising a preliminary data processing step of computing the logarithm of the image data received for each of the one or more channels.

4. The method of claim 1, wherein the combining the image data from the plurality of channels includes computing a weighted sum of the image data from the plurality of channels.

5. The method of claim 1, wherein self-filtering is used in connection with one or more of: (i) an anti-blurring compensation technique, and (ii) an anti-distortion compensation technique.

6. The method of claim 5, wherein the anti-blurring compensation technique includes multiplying each filter component by a magnitude of frequency.

7. The method of claim 5, wherein the anti-distortion compensation technique includes at least one of (i) a local anti-distortion compensation technique, and (ii) a global anti-distortion compensation technique.

8. The method of claim 7, wherein the local anti-distortion compensation technique includes applying a local maximum filter to the self-filter and wherein the global anti-distortion compensation technique includes truncating each self-filter magnitude above a defined value to maximum value equal to a fixed fraction of the maximum magnitude of the self-filter.

9. The method of claim 1, wherein Fourier shrinkage includes one of: (i) soft thresholding, and (ii) hard thresholding.

10. The method of claim 1, wherein an estimate for a threshold value for soft thresholding or hard thresholding is provided as a fixed multiple of an estimate of noise.

11. The method of claim 10, wherein the estimate of noise is determined based on an analysis of the Fourier components outside the known frequency response of a particular screening method used for the process-free plate.

12. The method of claim 1, wherein Fourier shrinkage is used in connection with one or more of: (i) de-blurring compensation, and (ii) band-pass filtering.

13. The method of claim 1, wherein self-filtering and Fourier shrinkage are used only for process-free plates having a patterned image with a limited range frequency components.

14. The method of claim 1, further comprising a data processing step of threshholding the filtered image data into binary image data based on a threshold value.

15. The method of claim 14, wherein the threshold value is determined using one of: (i) Otsu's method, (ii) Entropy thresholding, and (iii) a direct search of a histogram of the filtered image values for a local minimum between two local maxima.

16. The method of claim 15, wherein Entropy thresholding is used in connection with an error checking function for checking whether the determined threshold value is between the two peaks for a bimodal distribution of filtered image values.

17. The method of claim 14, wherein the imaging system displays a histogram of the filtered image and allows a user to assess potential threshold values.

18. The method of claim 1, further comprising a data processing step of threshold smoothing of the filtered image data.

19. The method of claim 18, wherein threshold smoothing includes one or more morphological operations selected from the group consisting of: (i) erosion, (ii) dilation, (iii) opening, and (iv) closing.

20. The method of claim 1, wherein the filtered image data is used for at least one of (i) computing dot coverage of the target region of the process-free plate, and (ii) rending the target region of the process-free plate on a display.

21. The method of claim 1, wherein each of the data processing steps is performed by means of a processor.

22. The method of claim 1, wherein, the received image data is specular-excluded image data.

23. The method of claim 1, wherein, the received image data is scatter image data.

24. The method of claim 1, wherein the target region of the process-free plate is illuminated by a band of light around the crosslinking wavelength.

25. An imaging system for processing image data of a process-free plate, the system comprising:
 a. one or more channels configured to receive image data, each channel adapted to image the same target region of a process-free plate using a different wavelength of light,
 b. processor-implemented means for combining the image data from the plurality of channels so as to optimize contrast-to-noise;
 c. processor-implemented means for filtering the image data using at least one of: (i) self-filtering, (ii) Fourier shrinkage, and (iii) Wavelet shrinkage,
wherein each wavelength of light is around the crosslinking wavelength for the process-free plate, and
wherein each channel images the same target region of a process-free plate using a wavelength of light that is within approximately one hundred nanometers (100 nm) of the crosslinking wavelength.

\* \* \* \* \*